United States Patent
Okada et al.

(10) Patent No.: US 9,771,203 B2
(45) Date of Patent: Sep. 26, 2017

(54) OXYGEN ABSORBING AGENT COMPOSITION

(71) Applicant: MITSUBISHI GAS CHEMICAL COMPANY, INC., Tokyo (JP)

(72) Inventors: Satoshi Okada, Kanagawa (JP); Shinichi Ikeda, Kanagawa (JP); Kenichiro Usuda, Hiratsuka (JP); Shinpei Iwamoto, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 214 days.

(21) Appl. No.: 14/398,582

(22) PCT Filed: May 13, 2013

(86) PCT No.: PCT/JP2013/063245
§ 371 (c)(1),
(2) Date: Nov. 3, 2014

(87) PCT Pub. No.: WO2013/168819
PCT Pub. Date: Nov. 14, 2013

(65) Prior Publication Data
US 2015/0090932 A1 Apr. 2, 2015

(30) Foreign Application Priority Data

May 11, 2012 (JP) ................................ 2012-109501

(51) Int. Cl.
| | | |
|---|---|---|
| *A23L 3/3436* | (2006.01) | |
| *B01J 20/22* | (2006.01) | |
| *B01J 31/26* | (2006.01) | |
| *B01D 53/14* | (2006.01) | |
| *B65D 81/26* | (2006.01) | |
| *B01D 53/02* | (2006.01) | |
| *B01J 20/32* | (2006.01) | |

(52) U.S. Cl.
CPC .......... *B65D 81/266* (2013.01); *A23L 3/3436* (2013.01); *B01D 53/02* (2013.01); *B01D 53/14* (2013.01); *B01J 20/22* (2013.01); *B01J 20/3204* (2013.01); *B01J 20/3253* (2013.01); *B01J 31/26* (2013.01); *B01D 2253/20* (2013.01); *B01D 2253/25* (2013.01); *B01D 2255/207* (2013.01); *B01D 2257/104* (2013.01)

(58) Field of Classification Search
CPC ......... A23L 3/3436; B01J 20/22; B01J 31/26; B01J 20/3253; B01J 20/3204; B01D 2253/20; B01D 53/14; B01D 53/02; B01D 2253/25; B01D 2255/207; B01D 2257/104; B65D 81/266
See application file for complete search history.

(56) References Cited

U.S. PATENT DOCUMENTS

| | | | |
|---|---|---|---|
| 2,953,586 A * | 9/1960 | Hafner | B01J 31/146 534/14 |
| 4,792,628 A | 12/1988 | Oshiro et al. | |
| 4,908,151 A | 3/1990 | Inoue et al. | |
| 5,346,644 A | 9/1994 | Speer et al. | |
| 6,063,503 A | 5/2000 | Hatakeyama et al. | |
| 2006/0180790 A1 | 8/2006 | Deshpande et al. | |
| 2011/0077149 A1 | 3/2011 | Ichihara et al. | |
| 2015/0090932 A1* | 4/2015 | Okada | A23L 3/3436 252/188.28 |
| 2015/0144838 A1* | 5/2015 | Iwamoto | C08F 8/00 252/188.28 |

FOREIGN PATENT DOCUMENTS

| | | |
|---|---|---|
| CN | 101193976 | 6/2008 |
| EP | 2444458 | 4/2012 |
| EP | 2873698 | 5/2015 |
| JP | 51-136845 | 11/1976 |
| JP | 60-142919 | 7/1985 |
| JP | 61-60610 | 3/1986 |
| JP | 4-298231 | 10/1992 |
| JP | 05-115776 | 5/1993 |
| JP | 7-165776 | 6/1995 |
| JP | H09-0151195 | 6/1997 |

(Continued)

OTHER PUBLICATIONS

Henri Rudler et al. "Copper(II)/-catalyzed aerobic oxidation of indane in the presence of aldehydes: intermediate formation of hydroperoxides", Journal of molecular Catalysis A: Chemical, vol. 154, 2000, pp. 277-279.

(Continued)

*Primary Examiner* — Joseph D Anthony
(74) *Attorney, Agent, or Firm* — Greenblum & Bernstein, P.L.C.

(57) ABSTRACT

An oxygen absorbing agent composition including at least one type of a compound having an indane skeleton represented by the following general formula (1) and a transition metal catalyst:

[Formula 1]

(1)

$$\begin{array}{c} R_7 \quad R_1 \quad R_8 \\ R_6 \\ \phantom{R_6} \diagdown \phantom{xxx} R_2 \\ R_5 \\ \phantom{R_5} \diagup \phantom{xxx} R_9 \\ R_4 \quad R_{10} \quad R_3 \end{array}$$

7 Claims, No Drawings

(56) References Cited

FOREIGN PATENT DOCUMENTS

| JP | 09-234832 | 9/1997 |
|----|-----------|--------|
| JP | 9-241635 | 9/1997 |
| JP | 2001-252560 | 9/2001 |
| JP | 2009-6204 | 1/2009 |
| JP | 2011-92921 | 5/2011 |

OTHER PUBLICATIONS

Search report from PCT/JP2013/063245, dated Jul. 30, 2013.
International Preliminary Report on Patentability in PCT/JP2013/063245, dated Nov. 11, 2014.

* cited by examiner

OXYGEN ABSORBING AGENT COMPOSITION

TECHNICAL FIELD

The present invention relates to an oxygen absorbing agent composition including a compound having an indane skeleton and a transition metal catalyst.

BACKGROUND ART

For the purpose of preventing oxygen oxidation and performing long-term storing of various goods tending to be affected by oxygen and accordingly deteriorated or degraded, typified by food, beverages, pharmaceuticals and cosmetics, there have been used oxygen absorbing agents performing removal of oxygen in the vessels containing these goods.

As oxygen absorbing agents, from the viewpoint of the oxygen absorbing capacity, easiness in handling and safety, there have generally been used oxygen absorbing agents including iron powder as the main reaction agent. However, such iron-based oxygen absorbing agents responds to metal detectors, and hence it has been difficult to use metal detectors for foreign matter inspection. Packages enclosing iron-based oxygen absorbing agents have possibility of ignition and hence cannot be heated with microwave ovens. In addition, the oxidation reaction of iron powder needs moisture, and hence iron-based oxygen absorbing agents have been able to develop the oxygen absorption effect thereof only for the objects to be stored which are high-moisture systems.

By constituting vessels and the like with multilayer materials having oxygen absorbing layers composed of oxygen-absorbing resin compositions prepared by mixing iron-based oxygen absorbing agents with thermoplastic resins, packaging vessels and the like have been developed in such a way that the gas barrier property of the vessels and the like is achieved and the oxygen absorbability is imparted to the vessels themselves (see Patent Literature 1). Specifically, an oxygen absorbing multilayer film includes, as the case may be, additionally an oxygen absorbing layer which is a thermoplastic resin layer including an oxygen absorbing agent as dispersed therein, through an intermediate layer formed of a thermoplastic resin, between conventional gas barrier multilayer films each including a heat seal layer and a gas barrier layer as laminated on each other; such an oxygen absorbing multilayer film is used as a film to which a function to absorb oxygen inside a vessel in addition to the function to prevent the permeation of oxygen from outside, and produced by heretofore known production methods such as extrusion lamination, coextrusion lamination and dry lamination. However, such vessels also have a problem such that such vessels are detected by metal detectors used for foreign matter inspection for food and the like, cannot be heated with microwave ovens, and can develop the effect thereof only for the objects to be stored which are high-moisture systems. An oxygen absorbing multilayer film using an oxygen absorbing agent such as iron powder suffers from problems such that such an oxygen absorbing multi-layer film is detected by a metal detector used for foreign matter inspection for food and the like, is insufficient in internal visibility due to opacity, and induces flavor degradation of the content because of the generation of aldehyde from the oxidation reaction of alcohol with iron as a catalyst when the content is an alcoholic beverage.

From the aforementioned circumstances, oxygen absorbing agents including an organic substance as a main reaction agent are demanded. As the oxygen absorbing agent including an organic substance as a main reaction agent, an oxygen absorbing agent including ascorbic acid as the main agent is known (see Patent Literature 2).

On the other hand, an oxygen-absorbing resin composition being composed of a resin and a transition metal catalyst and having an oxygen-capturing property is known. For example, a resin composition is known which is composed of a polyamide, in particular a xylylene group-containing polyamide as an oxidizable organic component and a transition metal catalyst (see, Patent Literature 3). Additionally, this Patent Literature 3 quotes as examples, for example, packaging materials obtained by molding resin compositions.

As an oxygen-absorbing resin composition requiring no moisture for oxygen absorption, an oxygen-absorbing resin composition composed of a resin having carbon-carbon unsaturated bonds and a transition metal catalyst is also known (see Patent Literature 4).

CITATION LIST

Patent Literature

Patent Literature 1: Japanese Patent Laid-Open No. H09-234832
Patent Literature 2: Japanese Patent Laid-Open No. S51-136845
Patent Literature 3: Japanese Patent Laid-Open No. 2001-252560
Patent Literature 4: Japanese Patent Laid-Open No. H05-115776

SUMMARY OF INVENTION

Technical Problem

However, the oxygen absorbing agent of Patent Literature 2 has a problem such that the oxygen absorbing agent composition is in the first place low in oxygen absorption performance, develops the effect only for an object to be stored which is a high-moisture system, and is comparatively expensive.

The resin composition of Patent Literature 3 develops the oxygen absorption function through the oxidation of the xylylene group-containing polyamide resin by including the transition metal catalyst, and accordingly suffers from a problem such that after absorption of oxygen, the oxidation degradation of the resin causes the breakage of the polymer chains to degrade the strength of the packaging vessel itself. In addition, the resin composition has a problem to be solved such that the oxygen absorption performance thereof is still insufficient, and the resin composition develops the effect thereof only for objects to be stored which are high-moisture systems.

The oxygen-absorbing resin composition of Patent Literature 4 also suffers from a problem such that the breakage of the polymer chain caused by the oxidation of the resin produces, similarly to the foregoing description, low molecular weight organic compounds to be odor components to result in generation of the odor after the absorption of oxygen.

The present invention has been achieved in view of the aforementioned circumstances, and takes as its object the provision of an oxygen absorbing agent composition being free from the generation of the odor after the absorption of oxygen and having an excellent oxygen absorption performance. Another object of the present invention is the provision of an oxygen absorbing agent composition developing an excellent oxygen absorption performance over a wide range of humidity conditions from a low humidity to a high humidity.

Solution to Problem

The present inventors made a diligent study, and consequently have perfected the present invention by discovering that an oxygen absorbing agent composition including at least one type of the compound having an indane skeleton and a transition metal catalyst can solve the foregoing problems.

Specifically, the present invention is as follows.

[1]

An oxygen absorbing agent composition including at least one type of a compound having an indane skeleton represented by the following general formula (1) and a transition metal catalyst:

[Formula 1]

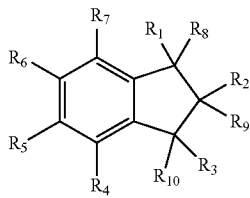

(1)

(wherein, in the formula, $R_1$ to $R_{10}$ are each independently a hydrogen atom or a monovalent substituent; the monovalent substituent is at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group, an imide group, a substituent represented by the following general formula (1a) and a substituent represented by the following general formula (1b); these groups may further have a substituent, and two substituents of $R_1$ to $R_{10}$ may be bonded to each other to form a ring. To the benzylic positions in the indane skeleton, at least one or more hydrogen atoms are bonded.)

[Formula 2]

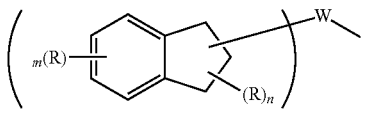

(1a)

[Formula 3]

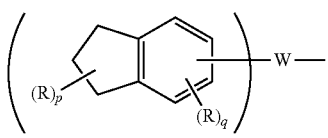

(1b)

(wherein, in the general formula (1a) and the general formula (1b), Rs each independently represent a monovalent substituent; the monovalent substituent is at least one selected from group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group and an imide group; these groups may further have a substituent, and two substituents of Rs may be bonded to each other to form a ring. W is an atomic bond or a divalent organic group; the divalent organic group is at least one selected from the group consisting of an aromatic hydrocarbon group, a saturated or unsaturated alicyclic hydrocarbon group, a linear or branched, saturated or unsaturated aliphatic hydrocarbon group, a heterocyclic group, —C(=O)—, —OC(=O)—, and —N(H)C(=O)—, and optional combinations of these; m represents an integer of 0 to 4, n represents an integer of 0 to 5, p represents an integer of 0 to 6, and q represents an integer of 0 to 3.)

[2]

The oxygen absorbing agent composition according to [1], further comprising a carrier substance supporting a compound having the indane skeleton.

[3]

The oxygen absorbing agent composition according to [2], wherein the transition metal catalyst is supported by the carrier substance.

[4]

The oxygen absorbing agent composition according to any one of <1> to <3>, wherein the transition metal catalyst comprises at least one transition metal selected from the group consisting of manganese, iron, cobalt, nickel and copper.

[5]

The oxygen absorbing agent composition according to any one of [1] to [4], wherein a mixing amount of the transition metal catalyst is 0.001 to 10 parts by mass in terms of the transition metal amount, based on 100 parts by mass of the compound having the indane skeleton.

[6]

The oxygen absorbing agent composition according to any one of <2> to <5>, wherein the carrier substance is at least one selected from the group consisting of synthetic calcium silicate, diatom earth, silica and activated carbon.

[7]

The oxygen absorbing agent composition according to any one of [2] to [6], wherein a mixing amount of the carrier substance is 10 to 1000 parts by mass based on 100 parts by mass of the compound having the indane skeleton.

[8]

An oxygen absorbing agent package formed by packaging the oxygen absorbing agent composition according to any one of [1] to [7] with an air permeable packaging material.

Advantageous Effects of Invention

According to the present invention, it is possible to provide an oxygen absorbing agent composition being free from the generation of the odor after the absorption of oxygen and having an excellent oxygen absorption performance. It is also possible to provide an oxygen absorbing agent composition developing an excellent oxygen absorption performance over a wide range of humidity conditions from a low humidity to a high humidity.

DESCRIPTION OF EMBODIMENT

Hereinafter, an embodiment for implementing the present invention (hereinafter, simply referred to as "the present embodiment") is described in detail. The present embodiment is presented as exemplification for describing the present invention, and the present invention is not intended to be limited to the following contents. The present invention can be implemented as appropriately modified within the scope of the gist thereof.

The oxygen absorbing agent composition of the present embodiment includes at least one type of the compound having the indane skeleton represented by the general formula (1) and a transition metal catalyst. The compound having the indane skeleton is free from the occurrence of the molecular chain breakage thereof due to oxidation even after the absorption of oxygen, and can maintain the structure thereof.

<Compound Having the Indane Skeleton>

The compound having the indane skeleton of the present embodiment is represented by the following general formula (1):

[Formula 4]

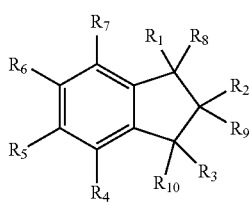

(1)

(wherein, in the formula, $R_1$ to $R_{10}$ are each independently a hydrogen atom or a monovalent substituent; the monovalent substituent is at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group and an imide group, a substituent represented by the following general formula (1a) and a substituent represented by the following general formula (1b); these groups may further have a substituent(s), and two substituents of $R_1$ to $R_{10}$ may be bonded to each other to form a ring. To the benzylic positions in the indane skeleton, at least one or more hydrogen atoms are bonded.)

[Formula 5]

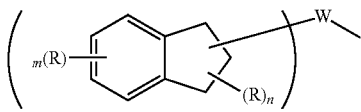

(1a)

[Formula 6]

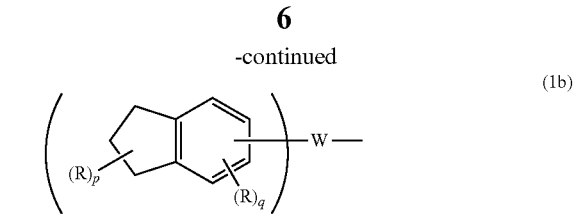

(1b)

(wherein, in the general formula (1a) and the general formula (1b), Rs each independently represent a monovalent substituent; the monovalent substituent is at least one selected from group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group and an imide group; these groups may further have a substituent(s), and two substituents of Rs may be bonded to each other to form a ring. W is an atomic bond or a divalent organic group; the divalent organic group is at least one selected from the group consisting of an aromatic hydrocarbon group, a saturated or unsaturated alicyclic hydrocarbon group, a linear or branched, saturated or unsaturated aliphatic hydrocarbon group, a heterocyclic group, —C(=O)—, —OC(=O)—, and —N(H)C(=O)—, and optional combinations of these; m represents an integer of 0 to 4, n represents an integer of 0 to 5, p represents an integer of 0 to 6, and q represents an integer of 0 to 3.)

In the foregoing general formula (1), examples of the monovalent substituents represented by $R_1$ to $R_{10}$ include, without being particularly limited to: halogen atoms (such as a chlorine atom, a bromine atom and an iodine atom), alkyl groups (linear, branched or cyclic alkyl groups having preferably 1 to 15 carbon atoms, more preferably 1 to 6 carbon atoms, such as a methyl group, an ethyl group, an n-propyl group, an isopropyl group, a t-butyl group, an n-octyl group, a 2-ethylhexyl group, a cyclopropyl group and a cyclopentyl group), alkenyl groups (linear, branched or cyclic alkenyl groups preferably having 2 to 10 carbon atoms, more preferably 2 to 6 carbon atoms, such as a vinyl group and an allyl group), alkynyl groups (alkynyl groups having preferably 2 to 10 carbon atoms, more preferably 2 to 6 carbon atoms, such as an ethynyl group and a propargyl group), aryl groups (aryl groups having preferably 6 to 16 carbon atoms, more preferably 6 to 10 carbon atoms, such as a phenyl group and a naphthyl group), heterocyclic groups (monovalent groups obtained by eliminating one hydrogen atom from 5-membered ring or 6-membered ring aromatic or non-aromatic heterocyclic compounds having preferably 1 to 12 carbon atoms, more preferably 2 to 6 carbon atoms, such as a 1-pyrazolyl group, a 1-imidazolyl group and a 2-furyl group), a cyano group, a hydroxy group, a carboxyl group, ester groups, amide groups, a nitro group, alkoxy groups (linear, branched or cyclic alkoxy groups having preferably 1 to 10 carbon atoms, more preferably 1 to 6 carbon atoms, such as a methoxy group and an ethoxy group), aryloxy groups (aryloxy groups having preferably carbon 6 to 12 carbon atoms, more preferably 6 to 8 carbon atoms, such as a phenoxy group), acyl groups (inclusive of a formyl group, alkyl carbonyl groups having preferably 2 to 10 carbon atoms, more preferably having 2 to 6 carbon atoms, and aryl carbonyl groups having preferably 7 to 12 carbon atoms, more preferably 7 to 9 carbon atoms, such as an acetyl group, a pivaloyl group and a benzoyl group), amino groups (alkyl amino groups having preferably 1 to 10 carbon atoms, more preferably 1 to 6 carbon atoms, anilino groups having preferably 6 to 12 carbon atoms, more preferably 6 to 8 carbon atoms, and heterocyclic amino groups having preferably 1 to 12 carbon atoms, more preferably 2 to 6 carbon atoms, such as an amino group, a methyl amino group and an anilino group), thiol groups, alkylthio groups (alkylthio groups having preferably 1 to 10 carbon atoms, more preferably 1 to 6 carbon atoms, such as a methylthio group and an ethylthio group), arylthio groups (arylthio groups having preferably 6 to 12 carbon atoms, more preferably 6 to 8 carbon atoms, such as a phenylthio group), heterocyclic thio groups (heterocyclic thio groups having preferably 2 to 10 carbon atoms, more preferably 1 to 6 carbon atoms, such as a 2-benzothiazolylthio group), and imide groups (imide groups having preferably 2 to 10 carbon atoms, more preferably 4 to 8 carbon atoms, such as an N-succinimide group and an N-phthalimide group).

The compound represented by the general formula (1) is a compound in which at least one or more hydrogen atoms are bonded to the benzylic positions of the indane skeleton. As described below, the action of the hydrogen atom(s) bonded to the benzylic position(s) of the indane skeleton and the action of the below-described transition metal catalyst can develop the oxygen absorbing capacity or the like. Examples of the compound in which at least one or more hydrogen atoms are bonded to the benzylic positions of the indane skeleton include a compound in which any one of $R_1$, $R_3$, $R_8$ and $R_{10}$ is a hydrogen atom.

When the monovalent substituents $R_1$ to $R_{10}$ have a hydrogen atom(s), the hydrogen atom(s) may further be substituted with a substituent T (here, the substituent T is defined in the same manner as in the foregoing description of the monovalent substituent R). Specific examples of such groups include, without being particularly limited to: alkyl groups substituted with a hydroxy group (such as a hydroxyethyl group), alkyl groups substituted with an alkoxy group (such as a methoxy ethyl group), alkyl groups substituted with an aryl group (such as a benzyl group), alkyl groups substituted with a primary or secondary amino group (such as an amino ethyl group), aryl groups substituted with an alkyl group (such as a p-tolyl group), and aryloxy groups substituted with an alkyl group (such as a 2-methyl phenoxy group). When the monovalent substituent R has a monovalent substituent T, the foregoing number of carbon atoms does not include the number of carbon atoms of the substituent T. For example, a benzyl group is regarded as an alkyl group having one carbon atom, substituted with a phenyl group, but not as an alkyl group having 7 carbon atoms. When the monovalent substituent R has the substituent(s) T, the number of the substituents T may be two or more.

Two of the monovalent substituents $R_1$ to $R_{10}$ may also be bonded to each other to form a ring. Examples of the compound having such a ring include the compounds in each of which two of $R_1$ to $R_{10}$ are condensed to each other to form a 5- to 8-membered ring. The ring as referred to herein may be any heretofore known ring structure, without being particularly limited, and is preferably an aromatic ring, an alicyclic ring or a heterocycle, having 4 to 7 carbon atoms (more preferably, a cyclohexane ring, a cycloheptane ring, acid anhydride rings (such as a succinic anhydride ring, a glutaric anhydride ring and an adipic anhydride ring), a benzene ring and a bicyclo ring).

From the viewpoint of the suppression of the loss due to volatilization during use, and at the same time, the increase of the oxygen absorption amount per unit mass of the compound, the compound having the indane skeleton represented by the foregoing general formula (1) is preferably: a compound in which at least one of $R_1$ to $R_{10}$ is a group selected from the group (hereinafter, also simply referred to as "the substituent group S") consisting of a substituted or unsubstituted alkyl group, a substituted or unsubstituted aryl group, a hydroxy group, a carboxyl group, a substituted or unsubstituted ester group, an alkoxy group, an acyl group, a substituted or unsubstituted amide group and a substituted or unsubstituted imide group; a compound in which two or more R are condensed to form a 5 to 6 membered ring is preferable. In the substituent group S, the following are more preferable: a substituted or unsubstituted alkyl group, a substituted or unsubstituted aryl group, a hydroxy group, a carboxyl group, an alkoxy group, a substituted or unsubstituted ester group and a substituted or unsubstituted amide group.

As a first preferable aspect of the compound having the indane skeleton represented by the general formula (1), a compound having the structure shown below is quoted.

[Formula 7]

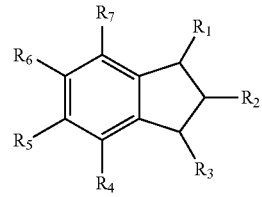

(1c)

(wherein, in the formula, $R_1$ to $R_7$ are each independently a monovalent substituent, and the monovalent substituents are the same as $R_1$ to $R_{10}$ described above, but two or more of $R_1$ to $R_7$ are not bonded to each other to form a ring(s).)

In the first aspect, at least two or more of $R_1$ to $R_7$ are each a group selected from the foregoing substituent group S, and $R_1$ to $R_7$ other than such groups are each preferably a hydrogen atom; more preferably, two of $R_1$ to $R_7$ are each a group selected form the substituent group S, and six of $R_1$ to $R_7$ are each a hydrogen atom.

As a second preferable aspect of the compound having the indane skeleton represented by the general formula (1), compounds having the structures shown below are quoted:

[Formula 8]

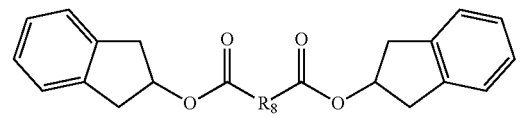

(1d)

(wherein, in the formula, $R_8$ represents a divalent group including at least a group selected from the group consisting of an aromatic hydrocarbon group, a saturated or unsaturated alicyclic hydrocarbon group, a linear or branched, saturated or unsaturated aliphatic hydrocarbon group and a heterocyclic group.)

The compounds represented by the general formula (1d) can be synthesized by heretofore known methods such as a transesterification reaction between 2-indanol and a dicarboxylic acid ester, or a dehydration condensation reaction between 2-indanol and a dicarboxylic acid.

$R_8$ is preferably a divalent aromatic hydrocarbon group or an alkylene group (having 1 to 10 carbon atoms, preferably 2 to 8 carbon atoms).

Specific particularly preferable examples of the compound having an indane skeleton of the present embodiment are shown by the following formulas (2) to (5).

[Formula 9]

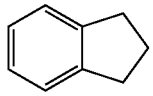
(2)

[Formula 10]

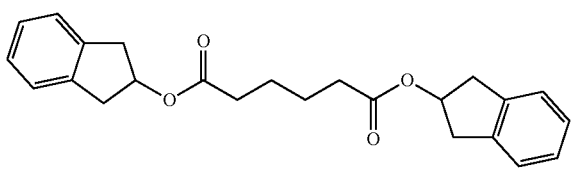 [SMILES: O=C(CCCCC(=O)OC1Cc2ccccc2C1)OC1Cc2ccccc2C1]
(3)

[Formula 11]

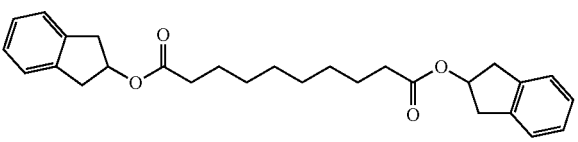 [SMILES: O=C(CCCCCCCCC(=O)OC1Cc2ccccc2C1)OC1Cc2ccccc2C1]
(4)

[Formula 12]

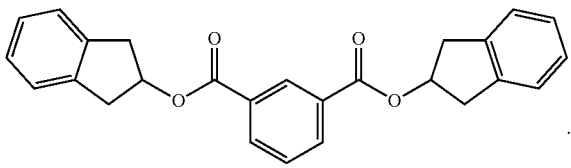
(5)

The foregoing compounds having the indane skeleton represented by the general formula (1) are all the compounds having a hydrogen atom in the benzylic position of the indane skeleton, and are used in combination with the below-described transition metal catalyst to undergo the abstraction of the hydrogen atom at the benzylic position so as to thereby develop an excellent oxygen absorbing capacity.

The oxygen absorbing agent composition of the present embodiment is suppressed in the increase of the odor intensity after the absorption of oxygen. The reason for the suppression is not clear, but the following oxidation reaction mechanism is inferred to be involved. Specifically, it is interpreted that in the compound having the indane skeleton represented by the general formula (1), first the hydrogen atom located at the benzylic position of the indane skeleton is abstracted to produce a radical, and subsequently, the reaction between the radical and oxygen oxidizes the carbon atom at the benzyl opposition to produce a hydroxy group or a ketone group. Accordingly, it is inferred that the oxygen absorbing agent composition does not involve the breakage of the molecule chain of the main oxygen-absorbing agent due to oxidation reaction, as occurring in the conventional technique, thus maintains the structure of the main oxygen-absorbing agent (compound), accordingly hardly produces, after the absorption of oxygen, a low molecular weight organic compound to be a cause for odor, and consequently suppresses the increase of the odor intensity after the absorption of oxygen. Also, from this viewpoint, in the compound having indane skeletons, the larger the number of the indane skeletons, the more preferable. In this way, the number of the reaction sites with oxygen is increased to result in a further excellent oxygen absorbing capacity. Moreover, the above-described hydrogen atoms located at the benzylic position of the indane skeleton may be present at least in one indane skeleton; however, when the indane skeleton has a substituent represented by the general formula (1a) or the general formula (1b), it is preferable, from the above-described viewpoint, that the hydrogen atom(s) bonded to the benzylic position(s) is also present in the indane skeleton of the general formula (1a) or the general formula (1b).

The molecular weight of the foregoing compound having the indane skeleton represented by the general formula (1) can be appropriately regulated, without being particularly limited, according to the intended properties and the substituents $R_1$ to $R_{10}$ to be introduced. From the viewpoint of suppressing the loss of the compound during use and, at the same time, increasing the oxygen absorption amount per unit mass of the compound, the molecular weight of the compound is preferably in a range from 150 to 1500 and more preferably in a range from 180 to 1200, and furthermore preferably in a range from 200 to 1000. The foregoing compounds having the indane skeleton represented by the general formula (1) can be used each alone or in combinations of two or more thereof.

Among the compounds having the indane skeleton represented by the general formula (1), the compounds having a higher boiling point, namely, having a lower vapor pressure at the time of use are preferably used, from the viewpoint of suppressing the loss of the compounds due to the volatilization at the time of use. For example, the compound having the lower vapor pressure at the temperature in the kneading with the thermoplastic resin is the more preferable because the loss, due to volatilization, of the compound at the time of the production of the oxygen-absorbing agent composition can be suppressed. As the index for such loss due to volatilization, for example, the 3% weight decrease temperature can be adopted. Specifically, the 3% weight decrease temperature of the compound is preferably 100° C. or higher, more preferably 150° C. or higher and furthermore preferably 200° C. or higher. The upper limit of the 3% weight decrease temperature is not particularly limited.

In the oxygen absorbing agent composition, the proportion of the compound having the indane skeleton(s) represented by the general formula (1) based on the total amount of the compound having the indane skeleton(s) represented by the general formula (1) and the below-described thermoplastic resin is preferably 1 to 30% by mass, more preferably 1.5 to 25% by mass and furthermore preferably 2 to 20% by mass. By regulating the proportion of the compound having the indane skeleton(s) represented by the general formula (1) so as to be equal to or larger than the above-described lower limit, the oxygen absorption performance can be more enhanced, and by regulating the proportion concerned so as to be equal to or smaller than the above-described upper limit, the moldability can be more enhanced.

<Transition Metal Catalyst>

As the transition metal catalyst used in the oxygen absorbing agent composition of the present embodiment, a transition metal catalyst appropriately selected from the heretofore known transition metal catalysts can be used, without being particularly limited, as long as the selected transition metal catalyst can function as the catalyst for the oxidation reaction of the compound having the indane skeleton.

Specific examples of such a transition metal catalyst include organic acid salts, halides, phosphates, phosphites, hypophosphites, nitrates, sulfates, oxides and hydroxides of transition metals. Examples of the transition metal contained in the transition metal catalyst include, without being limited to: titanium, vanadium, chromium, manganese, iron, cobalt, nickel, copper, zinc, ruthenium and rhodium. Among these, manganese, iron, cobalt, nickel and copper are preferable. Examples of the organic acid include, without being limited to: acetic acid, propionic acid, octanoic acid, lauric acid, stearic acid, acetylacetone, dimethyldithio carbamic acid, palmitic acid, 2-ethylhexanoic acid, neodecanoic acid, linoleic acid, tall oil acid, oleic acid, capric acid and naphthenic acid. The transition metal catalyst is preferably the combinations of these transition metals and these organic acids, and the combination of the transition metal such as manganese, iron, cobalt, nickel or copper and the organic acid such as acetic acid, stearic acid, 2-ethylhexanoic acid, oleic acid or naphthenic acid is more preferable. The transition metal catalyst can be used each alone or in combinations of two or more thereof.

The mixing amount of the transition metal catalyst can be appropriately set according to the types and intended performances of the compound having the indane skeleton, the thermoplastic resin, and the transition metal catalyst to be used, without being particularly limited. From the viewpoint of the oxygen absorption amount of the oxygen absorbing agent composition, the mixing amount of the transition metal catalyst is preferably 0.001 to 10 parts by mass, more preferably 0.002 to 2 parts by mass and furthermore preferably 0.005 to 1 part by mass, in terms of the transition metal amount, based on 100 parts by mass of the compound having the indane skeleton.

The oxygen absorbing agent composition of the present embodiment may also further include a carrier substance, if necessary. In this case, the oxygen absorbing agent composition including the carrier substance can be used as an oxygen absorbing agent as it is as a mixture composed of the compound, the transition metal catalyst and the carrier substance. Alternatively, by allowing a carrier substance to support or to be impregnated with the foregoing compound having the indane skeleton represented by the general formula (1), together with the transition metal catalyst, if necessary, it is possible to prepare a support (hereinafter, also referred to as "oxygen absorbing agent support") in which the compound is supported by or impregnated into the carrier substance, and the resulting support can also be used as an oxygen absorbing agent. By allowing the carrier substance to support or to be impregnated with the compound, the contact area with oxygen can be made larger and the oxygen absorption rate or the oxygen absorption amount can be increased, and the handling of the oxygen absorbing agent can be made simple and convenient.

As the carrier substance, a carrier substance can be appropriately selected to be used among carrier substances heretofore known in the art. Specific examples of such a carrier substance include, without being particularly limited to: powders of synthetic calcium silicate, hydrated lime, activated carbon, zeolite, perlite, diatom earth, activated clay, silica, kaolin, talc, bentonite, activated alumina, gypsum, silica alumina, calcium silicate, magnesium oxide, graphite, carbon black, aluminum hydroxide and iron oxide. Among these, synthetic calcium silicate, diatom earth, silica and activated carbon are preferably used. The carrier substances can be each alone or in combinations of two or more thereof.

The mixing amount of the carrier substance can be appropriately set according to the types and intended performances of the compound, the thermoplastic resin, and the transition metal catalyst to be used, without being particularly limited; however, the mixing amount of the carrier substance is preferably 10 to 1000 parts by mass and more preferably 20 to 800 parts by mass based on 100 parts by mass of the compound having the indane skeleton represented by the general formula (1).

The support of the compound by the carrier substance can be performed according to a conventional method, without being particularly limited. For example, a liquid mixture containing the foregoing compound having the indane skeleton represented by the general formula (1) or a liquid mixture containing the compound and a transition metal catalyst is prepared, the liquid mixture is applied to the carrier substance, or the carrier substance is immersed in the liquid mixture, and thus it is possible to obtain an oxygen absorbing agent support in which the compound (and if necessary, a transition metal catalyst) is supported by (impregnated into) the carrier substance. When the liquid mixture is prepared, a solvent can further be included. When the compound or the transition metal catalyst is solid, the use of a solvent allows the compound or the transition metal catalyst to be efficiently supported by the carrier substance. The solvent to be used herein can appropriately be selected to be used from the heretofore known solvents in consideration of the solubilities of the compound and the transition metal catalyst. Examples of the preferable solvents include, without being particularly limited to: organic solvents such as methanol, 2-propanol, ethylene glycol, toluene, xylene, methyl acetate, ethyl acetate, butyl acetate, diisopropyl ether, tetrahydrofuran, methyl ethyl ketone, dichloromethane and chloroform; among these, methanol, 2-propanol, ethyl acetate and methyl ethyl ketone are more preferable. The solvents can be used each alone or in combinations of two or more thereof.

<Thermoplastic Resin>

The oxygen absorbing agent composition of the present embodiment may also include a thermoplastic resin. In this case, the forms of inclusion of the compound having the indane skeleton and the transition metal catalyst in the oxygen-absorbing agent composition are not particularly limited. For example, the compound having the indane skeleton and the transition metal catalyst may be included as they are in the thermoplastic resin, or alternatively, the compound having the indane skeleton and the transition metal catalyst may be included, in the state of being supported by the foregoing carrier substance, in thermoplastic resin.

The preparation of the oxygen-absorbing agent composition can be performed according to a conventional method, without being particularly limited. For example, the compound having the indane skeleton and the transition metal catalyst, and the carrier substance mixed according to need are mixed in or kneaded with the thermoplastic resin, and thus the oxygen-absorbing agent composition can be obtained.

As the thermoplastic resin, heretofore known thermoplastic resins can be appropriately used. Examples of the thermoplastic resins include, without being particularly limited to: polyolefins such as low density polyethylene, medium density polyethylene, high density polyethylene, linear low density polyethylene, linear ultra low density polyethylene, polypropylene, poly-1-butene, poly-4-methyl-1-pentene, and random or block copolymers of α-olefins such as ethylene, propylene, 1-butene and 4-methyl-1-pentene; acid-modified polyolefins such as maleic anhydride graft polyethylene and maleic anhydride graft polypropylene; ethylene-vinyl compound copolymers such as ethylene-vinyl acetate copolymer, ethylene-vinyl alcohol copolymer, ethylene-vinyl chloride copolymer, ethylene-(meth)acrylic acid copolymer and ionically cross-linked products (ionomers) thereof, and ethylene-methyl methacrylate copolymer; styrene-based resins such as polystyrene, acrylonitrile-styrene copolymer and α-methyl styrene-styrene copolymer; polyvinyl compounds such as polymethyl acrylate and polymethyl methacrylate; polyamides such as nylon 6, nylon 66, nylon 610, nylon 12 and polymethaxylylene adipamide (MXD6); polyesters such as polyethylene terephthalate (PET), polybutylene terephthalate (PBT), polytrimethylene terephthalate (PTT), polyethylene naphthalate (PEN), glycol-modified polyethylene terephthalate (PETG), polyethylene succinate (PES), polybutylene succinate (PBS), polylactic acid, polyglycolic acid, polycaprolactone and polyhydroxyalkanoate; polycarbonate; polyethers such as polyethylene oxide, or mixtures of these. The thermoplastic resins can be used each alone or in combinations of two or more thereof.

Among these, the thermoplastic resin is preferably at least one resin selected from the group consisting of polyolefin, polyester, polyamide, ethylene-vinyl alcohol copolymer, a plant-derived resin and a chlorine-based resin. Moreover, the thermoplastic resin is preferably at least one resin selected from polyolefin, polyester, polyamide, ethylene-vinyl alcohol copolymer and a chlorine-based resin. Hereinafter, these preferable thermoplastic resins are described in detail.

<Polyolefin>

Examples of the polyolefin used in the oxygen absorbing agent composition of the present embodiment include: polyethylenes such as low density polyethylene, medium density polyethylene, high density polyethylene, linear low density polyethylene and linear ultra-low-density polyethylene; olefin homopolymers such as polypropylene, polybutene-1 and poly-4-methylpentene-1; ethylene-α-olefin copolymers such as ethylene-propylene random copolymer, ethylene-propylene block copolymer, ethylene-propylene-poly-butene-1 copolymer and ethylene-cyclic olefin copolymer; other ethylene copolymers such as ethylene-α,β-unsaturated carboxylic acid copolymers such as ethylene-(meth)acrylic acid copolymer, ethylene-α,β-unsaturated carboxylic acid ester copolymers such as ethylene-ethyl (meth)acrylate copolymer, ion cross-linked products of ethylene-α,β-unsaturated carboxylic acid copolymer and ethylene-vinyl acetate copolymer; ring-opening polymers of cyclic olefins and the hydrogenated products thereof; cyclic olefin-ethylene copolymers; and the graft modified polyolefins obtained by graft modifying these polyolefins with, for example, acid anhydrides such as maleic anhydride.

<Polyester>

Examples of the polyester used in the oxygen absorbing agent composition of the present embodiment include: polyesters obtained from one or two or more selected from polybasic carboxylic acids inclusive of dicarboxylic acids and ester-forming derivatives of these and one or two or more selected from polyhydric alcohols inclusive of glycol; polyesters obtained from hydroxycarboxylic acids and ester-forming derivatives of these; and polyesters obtained from cyclic esters. Ethylene terephthalate-based thermoplastic polyesters are preferably products in which the ethylene terephthalate unit accounts for most of the ester repeating units, and commonly accounts for 70 mol % or more of the ester repeating units, the glass transition point (Tg) falls within a range from 50 to 90° C., and the melting point (Tm) falls within a range from 200 to 275° C. As an ethylene terephthalate-based thermoplastic polyester, polyethylene terephthalate is excellent in pressure resistance, heat resistance, heat and pressure resistance and the like; however, it is also possible to use copolymerized polyesters including, in addition to the ethylene terephthalate unit, a small amount of the ester unit obtained from dicarboxylic acid such as isophthalic acid or naphthalenedicarboxylic acid and a diol such as propylene glycol.

Specific examples of the dicarboxylic acid include: saturated aliphatic dicarboxylic acids exemplified by oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid and dimeric acid, or ester-forming derivatives of these; unsaturated aliphatic dicarboxylic acids exemplified by fumaric acid, maleic acid and itaconic acid, or ester-forming derivatives of these; naphthalene dicarboxylic acids such as orthophthalic acid, isophthalic acid, terephthalic acid, 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid, aromatic dicarboxylic acids exemplified by 4,4'-biphenyl dicarboxylic acid, 4,4'-biphenyl sulfone dicarboxylic acid, 4,4'-biphenyl ether dicarboxylic acid, 1,2-bis(phenoxy)ethane-p,p'-dicarboxylic acid, and anthracene dicarboxylic acid, or ester-forming derivatives of these; and metal sulfonate group containing aromatic dicarboxylic acids exemplified by 5-sodium sulfoisophthalic acid, 2-sodium sulfoterephthalic acid, 5-lithium sulfoisophthalic acid, 2-lithium sulfoterephthalic acid, 5-potassium sulfoisophthalic acid and 2-potassium sulfoterephthalic acid, or lower alkyl ester derivatives of these.

Among the above-described dicarboxylic acids, from the viewpoint of the physical properties and others of the obtained polyester, in particular, it is preferable to use terephthalic acid, isophthalic acid, naphthalenedicarboxylic acid and the like. If necessary, other dicarboxylic acids may also be copolymerized.

Specific examples of the polybasic carboxylic acids other than these dicarboxylic acids include: ethane tricarboxylic acid, propane tricarboxylic acid, butane tetracarboxylic acid, pyromellitic acid, trimellitic acid, trimesic acid, 3,4,3',4'-biphenyl tetracarboxylic acid, and ester-forming derivatives of these.

Specific examples of the glycols include: aliphatic glycols exemplified by ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecanediol, polyethylene glycol, polytrimethylene glycol and polytetramethylene glycol; aromatic glycols exemplified by hydroquinone, 4,4'-dihydroxybisphenol, 1,4-bis(β-hydroxy ethoxy)benzene, 1,4-bis(β-hydroxy ethoxy phenyl)

sulfone, bis(p-hydroxyphenyl) ether, bis(p-hydroxyphenyl) sulfone, bis(p-hydroxyphenyl)methane, 1,2-bis(p-hydroxyphenyl)ethane, bisphenol A, bisphenol C and 2,5-naphthalenediol; and glycols obtained by adding ethylene oxide to these glycols.

Among the foregoing glycols, it is preferable to use as the main component ethylene glycol, 1,3-propylene glycol, 1,4-butylene glycol or 1,4-cyclohexane dimethanol.

Specific examples of the polyhydric alcohols other than these glycols include: trimethylolmethane, trimethylolethane, trimethylolpropane, pentaerythritol, glycerol and hexanetriol.

Specific examples of the hydroxy carboxylic acids include lactic acid, citric acid, malic acid, tartaric acid, hydroxyacetic acid, 3-hydroxylactic acid, p-hydroxybenzoic acid, p-(2-hydroxyethoxy)benzoic acid and 4-hydroxy cyclohexane carboxylic acid, or ester-forming derivatives of these.

Specific examples of the cyclic esters include ε-caprolactone, β-propiolactone, β-methyl-β-propiolactone, δ-valerolactone, glycolide and lactide.

Specific examples of the ester-forming derivatives of the polybasic carboxylic acids and hydroxy carboxylic acids include the alkyl esters, acid chlorides and acid anhydrides of these.

Among the foregoing, polyesters including as the main acid component terephthalic acid or an ester-forming derivative thereof, or a naphthalene dicarboxylic acid or an ester-forming derivative thereof, and including as the main glycol component an alkylene glycol are preferable.

The polyester including as the main acid component terephthalic acid or an ester-forming derivative thereof is a polyester including terephthalic acid or the ester-forming derivative thereof in a total amount of preferably 70 mol % or more, more preferably 80 mol % or more and furthermore preferably 90 mol % or more, based on the whole acid components. The polyester including as the main acid component a naphthalene dicarboxylic acid or an ester-forming derivative thereof is a polyester including the naphthalene dicarboxylic acid or the ester-forming derivative thereof in a total amount of preferably 70 mol % or more, more preferably 80 mol % or more and furthermore preferably 90 mol % or more, based on the whole acid components.

Among the foregoing naphthalene dicarboxylic acids or the ester-forming derivative thereof, 1,3-naphthalene dicarboxylic acid, 1,4-naphthalene dicarboxylic acid, 1,5-naphthalene dicarboxylic acid, 2,6-naphthalene dicarboxylic acid and 2,7-naphthalene dicarboxylic acid, being exemplified in the foregoing dicarboxylic acids, or ester-forming derivatives of these are preferable.

The foregoing polyester including as the main glycol component alkylene glycols is a polyester, including the alkylene glycols in a total amount of preferably 70 mol % or more, more preferably 80 mol % or more and furthermore preferably 90 mol % or more, based on the whole glycol components. The alkylene glycols as referred to herein may include in the molecule chain thereof a substituent(s) or an alicyclic structure(s).

The copolymerization component other than terephthalic acid/ethylene glycol is preferably, from the viewpoint of the compatibility between transparency and moldability, at least one or more selected from the group consisting of isophthalic acid, 2,6-naphthalene dicarboxylic acid, diethylene glycol, neopentyl glycol, 1,4-cyclohexane dimethanol, 1,2-propanediol, 1,3-propanediol and 2-methyl-1,3-propanediol, and is more preferably at least one or more selected from the group consisting of isophthalic acid, diethylene glycol, neopentyl glycol and 1,4-cyclohexane dimethanol.

A preferable example of the polyester used in the oxygen absorbing agent composition of the present embodiment is a polyester in which the main repeating unit is composed of ethylene terephthalate. The polyester is more preferably a linear polyester containing 70 mol % or more of the ethylene-terephthalate unit, furthermore preferably a linear polyester containing 80 mol % or more of the ethylene-terephthalate unit, and particularly preferably a linear polyester containing 90 mol % or more of the ethylene terephthalate unit.

Another preferable example of the polyester used in the oxygen absorbing agent composition of the present embodiment is a polyester in which the main repeating unit is constituted with ethylene-2,6-naphthalate. The polyester is more preferably a linear polyester containing 70 mol % or more of the thylene-2,6-naphthalate unit, furthermore preferably a linear polyester containing 80 mol % or more of the ethylene-2,6-naphthalate and particularly preferably a linear polyester containing 90 mol % or more of the ethylene-2,6-naphthalate.

Yet another preferable example of the polyester used in the oxygen absorbing agent composition of the present embodiment is: a linear polyester containing 70 mol % or more of the propylene terephthalate unit; a linear polyester containing 70 mol % or more of the propylene naphthalate unit; a linear polyester containing 70 mol % or more of the 1,4-cyclohexane dimethylene terephthalate unit; a linear polyester containing 70 mol % or more of the butylene naphthalate unit; or a linear polyester containing 70 mol % or more of butylene terephthalate unit.

As the polyester particularly preferable from the viewpoint of the compatibility between transparency and moldability, the combinations of the whole polyester are a combination of terephthalic acid/isophthalic acid/ethylene glycol, a combination of terephthalic acid/ethylene glycol/1,4-cyclohexane dimethanol and a combination of terephthalic acid/ethylene glycol/neopentyl glycol. As a matter of course, the foregoing polyester may include a small amount (5 mol % or less) of diethylene glycol produced by the dimerization of ethylene glycol during the esterification (transesterification) reaction or the polycondensation reaction.

As another preferable example of the polyester used in the oxygen absorbing agent composition of the present embodiment, polyglycolic acid obtained by the polycondensation of glycolic acid or methyl glycolate, or by ring-opening polycondensation of glycolide is quoted. The polyglycolic acid may be a polyglycolic acid copolymerized with other components such as lactide.

<Polyamide>

Examples of the polyamide used in the oxygen absorbing agent composition of the present embodiment include: a polyamide including as the main constitutional unit the unit derived from lactam or an amino carboxylic acid; an aliphatic polyamide including as the main constitutional unit the unit derived from an aliphatic diamine and an aliphatic dicarboxylic acid; a partially aromatic polyamide including as the main constitutional unit the unit derived from an aliphatic diamine and an aromatic dicarboxylic acid; and a partially aromatic polyamide including as the main constitutional unit the unit derived from an aromatic diamine and an aliphatic dicarboxylic acid. The polyamide as referred to herein may be a polymer obtained by copolymerizing the monomer units other than the main constitutional unit, if necessary.

Specific examples of the lactam or the amino carboxylic acid include lactams such as ε-caprolactam and laurolactam; amino carboxylic acids such as amino caproic acid and amino undecanoic acid; and aromatic amino carboxylic acids such as p-amino methyl benzoic acid.

Specific examples of the aliphatic diamine include aliphatic diamines having 2 to 12 carbon atoms or functional derivatives thereof, and alicyclic diamines having 2 to 12 carbon atoms. The aliphatic diamine may be a linear aliphatic diamine or a branched chain aliphatic diamine. Specific examples of the linear aliphatic diamine include: aliphatic diamines such as ethylenediamine, 1-methylethylenediamine, 1,3-propylenediamine, tetramethylenediamine, pentamethylenediamine, hexametjhylenediamine, heptamethylenediamine, octamethylenediamine, nonamethylenediamine, decamethylenediamine, undecamethylenediamine and dodecamethylenediamine. Specific examples of the alicyclic diamine include cyclohexanediamine, 1,3-bis(aminomethyl)cyclohexane and 1,4-bis(aminomethyl)cyclohexane.

Specific examples of the aliphatic dicarboxylic acid include linear aliphatic dicarboxylic acids and alicyclic dicarboxylic acids. In particular, linear aliphatic dicarboxylic acid having an alkylene group having 4 to 12 carbon atoms are preferable. Linear aliphatic dicarboxylic acids include: adipic acid, sebacic acid, malonic acid, succinic acid, glutaric acid, pimelic acid, suberic acid, azelaic acid, undecanoic acid, undecanedioic acid, dodecanedioic acid and dimeric acid, and functional derivatives of these. Alicyclic dicarboxylic acids include: 1,4-cyclohexanedicarboxylic acid, hexahydroterephthalic acid and hexahydroisophthalic acid.

Specific examples of the aromatic diamine include metaxylylenediamine, paraxylylenediamine and para-bis(2-aminoethyl)benzene.

Specific examples of the aromatic dicarboxylic acid include terephthalic acid, isophthalic acid, phthalic acid, 2,6-naphthalene dicarboxylic acid, diphenyl-4,4'-dicarboxylic acid and diphenoxyethane dicarboxylic acid, and functional derivatives of these.

Specific examples of the polyamide include polyamide 4, polyamide 6, polyamide 10, polyamide 11, polyamide 12, polyamide 4,6, polyamide 6,6, polyamide 6,10, polyamide 6T, polyamide 9T, polyamide 6IT, polymethaxylylene adipamide (polyamide MXD6), isophthalic acid copolymerized polymetaxylylene adipamide (polyamide MXD6I), polymetaxylylene sebacamide (polyamide MXD10), polymetaxylylene dodecanamide (polyamide MXD12), poly-1,3-bisaminocyclohexane adipamide (polyamide BAC6) and polyparaxylylene sebacamide (polyamide PXD10). More preferable polyamides include polyamide 6, polyamide MXD6 and polyamide MXD6I.

The copolymerization component which may be copolymerized with the foregoing polyamides including a polyether having at least one terminal amino group or one terminal carboxyl group and having a number average molecular weight of 2000 to 20000, an organic carboxylic acid salt of the polyether having the terminal amino group, and an amino salt of the polyether having the terminal carboxyl group can be used. Specific examples of such a copolymerization component include bis(aminopropyl)poly (ethylene oxide) (polyethylene glycol having a number average molecular weight of 2000 to 20000).

The partially aromatic polyamide may include a constitutional unit derived from a tribasic or higher polybasic carboxylic acid such as trimellitic acid or pyromellitic acid, within a range of substantially being linear.

<Ethylene-Vinyl Alcohol Copolymer>

The ethylene-vinyl alcohol copolymer used in the oxygen absorbing agent composition of the present embodiment is preferably an ethylene-vinyl alcohol copolymer in which the content of ethylene is 15 to 60 mol % and the degree of saponification of the vinyl acetate component is 90 mol % or more. The content of ethylene is preferably 20 to 55 mol % and more preferably 29 to 44 mol %. The degree of saponification of vinyl acetate is preferably 95 mol % or more. The ethylene-vinyl alcohol copolymer may further include small amounts of comonomers such as α-olefins such as propylene, isobutene, α-octene, α-dodecene and α-octadecene; unsaturated carboxylic acids or the salts thereof; partial alkyl esters; complete alkyl esters; nitriles; amides; anhydrides; and unsaturated sulfonic acids or the salts thereof.

<Plant-Derived Resins>

The plant-derived resin used in the oxygen absorbing agent composition of the present embodiment is only required to be a resin including as a raw material a plant-derived substance and is not limited with respect to the plant to be the raw material of the resin. Specific examples of the plant-derived resin include an aliphatic polyester-based biodegradable resin. Examples of the aliphatic polyester-based biodegradable resin include: poly(α-hydroxy acids) such as polyglycolic acid (PGA) and polylactic acid (PLA); and polyalkylene alkanoates such as polybutylene succinate (PBS) and polyethylene succinate (PES).

<Chlorine-Based Resins>

The chlorine-based resin used in the oxygen absorbing agent composition of the present embodiment is only required to be a resin including chlorine in the constitutional unit thereof, and heretofore known such resins can be used. Specific examples of the chlorine-based resin include: polyvinyl chloride, polyvinylidene chloride and copolymers of these with vinyl acetate, maleic acid derivatives and higher alkyl vinyl ethers.

Among the thermoplastic resins presented as examples, linear low density polyethylene (LLDPE), ethylene-vinyl alcohol copolymer (EVOH), nylon 6 (PA6), polyethylene terephthalate (PET) and polyvinyl chloride (PVC) preferably used as food packaging materials.

The oxygen absorbing agent composition of the present embodiment may further include, if necessary, a radical generating agent or a photoinitiator in order to promote the oxygen absorption reaction. Specific examples of the radical generating agent include, without being particularly limited to: various N-hydroxyimide compounds, such as N-hydroxysuccinimide, N-hydroxymaleimide, N,N'-dihydroxycyclohexane-tetracarboxylic acid diimide, N-hydroxyphthalimide, N-hydroxytetrachlorophthalimide, N-hydroxytetrabromophthalimide, N-hydroxyhexahydrophthalimide, 3-sulfonyl-N-hydroxyphthalimide, 3-methoxycarbonyl-N-hydroxyphthalimide, 3-methyl-N-hydroxyphthalimide, 3-hydroxy-N-hydroxyphthalimide, 4-nitro-N-hydroxyphthalimide, 4-chloro-N-hydroxyphthalimide, 4-methoxy-N-hydroxyphthalimide, 4-dimethylamino-N-hydroxyphthalimide, 4-carboxy-N-hydroxyhexahydrophthalimide, 4-methyl-N-hydroxyhexahydrophthalimide, N-hydroxy het acid imide, N-hydroxy hymic acid imide, N-hydroxy trimellitic acid imide and N,N-dihydroxy pyromellitic acid diimide. Specific examples of the photoinitiator include, without being particularly limited to: benzophenone and derivatives thereof, thiazine dyes, metal porphyrin derivatives and anthraquinone derivatives. These radical generating agents and photoinitiators can be used each alone or in combinations of two or more thereof.

The oxygen-absorbing agent composition may include various additives heretofore known in the art, within the range not impairing the advantageous effects of the present embodiment. Examples of such optional components include, without being particularly limited to: fillers such as calcium carbonate, clay, mica and silica; drying agents; pigments; dyes; antioxidants; slipping agents; antistatic agents; stabilizers; plasticizers; and deodorants.

The oxygen absorbing agent composition of the present embodiment can be used, needless to say, in a single layer form as packaging materials and packaging vessels, and can also be used in a laminate form including at least a layer formed of the oxygen absorbing agent composition and a layer formed of another resin as oxygen absorbing multilayer packaging materials and oxygen absorbing multilayer packaging vessels. In general, the oxygen absorbing agent composition of the present embodiment is preferably disposed on the inside of a vessel or the like rather than on the outside surface so as not to be exposed on the outside surface of the vessel or the like, or alternatively, is preferably disposed on the outside of a vessel or the like rather than on the inside surface of the vessel or the like for the purpose of avoiding direct contact with the content. As described above, it is preferable to use the oxygen absorbing agent composition at least as an intermediate layer of multiple layers.

The oxygen absorbing agent composition of the present embodiment can also be used, in a form of a film or a sheet, as an oxygen absorbing multilayer body having at least a sealant layer including a polyolefin resin, an oxygen absorbing layer including the oxygen absorbing agent composition and a gas barrier layer including a gas barrier substance. The obtained oxygen absorbing multilayer body can also be used as an oxygen absorbing paper vessel by further laminating a paper base material on the outer layer of the gas barrier layer.

As the gas barrier substance used in the gas barrier layer of the present embodiment, a gas barrier thermoplastic resin, a gas barrier thermosetting resin, various vapor deposited films of silica, alumina, aluminum, and metal foils such as aluminum foil can be used. Examples of the gas barrier thermoplastic resin include, without being particularly limited to: ethylene-vinyl alcohol copolymer, MXD6 and polyvinylidene chloride. Examples of the gas barrier thermosetting resin include, without being particularly limited to: a gas barrier epoxy resin (for example, "Maxive" manufactured by Mitsubishi Gas Chemical Company, Inc.).

For the method for producing an oxygen absorbing multilayer body, according to the properties of each of the materials, the purpose of the processing, the steps of the processing, heretofore known methods such as an coextrusion method, various laminating methods and various coating methods can be used. When the oxygen absorbing multilayer body is molded into a film or sheet shape, examples of the production method include: a method in which a molten resin composition is extruded through a T-die, a circular die or the like from an extruder to produce a film or a sheet; and a method in which an adhesive is applied to an oxygen absorbing film or sheet, and the oxygen absorbing film or sheet is bonded to another film or sheet to produce a film or sheet. Alternatively, a multilayer vessel having a predetermined shape or a preform for production of a vessel can be formed by coinfecting or successively injecting molten resins through a multilayer multiple die into an injection mold by using an injection machine. From the preform, a stretched blow bottle can be produced by heating the preform at a stretching temperature, stretching the heated preform in an axial direction and at the same time stretching the heated preform in the circumferential direction by a fluid pressure.

The oxygen absorbing multilayer body can be used by molding into a film shape, and by processing the resulting film into a bag shape or a lid member. By molding into a sheet shape and applying a molding method such as vacuum molding, compressed-air molding or plug-assist molding, the oxygen absorbing multilayer body of the present embodiment can also be heat molded into an oxygen absorbing multilayer vessel having a predetermined shape such as a tray, a cup, a bottle or a tube. In addition, the oxygen absorbing multilayer body of the present embodiment can also be preferably used as a pouch provided with an opening allowing water vapor to pass easily therethrough, so as to cope with microwave cooking, in such a way that a content such as a food product is packed in a bag-shaped vessel formed of the oxygen absorbing multilayer body, serving as a pouch, and an opening is provided in the vessel so as for water vapor to be discharged from the opening at the time of microwave cooking.

[Oxygen Absorbing Agent Package]

The oxygen absorbing agent composition of the present embodiment can also be used as a small bag-shaped oxygen absorbing agent package in such a way that the oxygen absorbing agent composition of the present embodiment is processed into a powdery material, a granular material, a pellet type material or any other small piece type material, and the resulting material is filled in an air permeable packaging material. The air permeable packaging material is not particularly limited as long as the air permeable packaging material can be used in application to oxygen absorbing agents; however, for the purpose of achieving sufficient oxygen absorption effect, it is preferable to use a packaging material having an air permeability as high as possible. Examples of such a packaging material include: papers such as Japanese paper, Western paper and rayon paper; nonwoven fabrics using various fibers obtained from pulp, cellulose and synthesis resins; plastic films or perforated products thereof; or microporous films obtained by stretching after the addition of calcium carbonate or the like; and in addition, products obtained by laminating two or more selected from these. Examples of the plastic film include: a laminated film obtained by laminating on and bonding to each other a film of polyethylene terephthalate, polyamide, polypropylene or polycarbonate and a film, as a seal layer, of polyethylene, ionomer, polybutadiene, ethylene-acrylic acid copolymer, ethylene-methacrylic acid copolymer or ethylene-vinyl acetate copolymer.

[Oxygen Absorbing Vessel]

An oxygen absorbing vessel can be formed by incorporating the oxygen absorbing agent composition or the oxygen absorbing multilayer body of the present embodiment into the whole or a part of the packaging vessel. The oxygen absorbing vessel of the present embodiment absorbs the oxygen in the vessel, also absorbs the oxygen permeating or penetrating through the vessel wall from outside the vessel when even a small amount of oxygen permeates or penetrates through the vessel wall, and accordingly can prevent the deterioration of the contained matter to be stored (the object to be stored) due to oxygen.

The shape of the oxygen absorbing vessel of the present embodiment is not particularly limited, and can be appropriately determined according to the object to be housed or stored. Such a vessel can be suitably used as, for example, a pouch, a cup, a tray and a bottle.

Additionally, for example, by forming a bag from the film-shaped or sheet-shaped oxygen absorbing agent composition or oxygen absorbing multilayer body, the oxygen absorbing agent composition or the oxygen absorbing multilayer body can be used as, for example, three side seal flat bag, a standing pouch, a gazette packaging bag, a pillow packaging bag, a multi-compartment pouch composed of a main compartment and subcompartments with an easily releasable wall between the main compartment and each of the subcompartments, and a shrinkable film package. Vessels having optional shapes can also be made from the oxygen absorbing agent composition and the oxygen absorbing multilayer body by applying heat molding to these composition and laminate.

More specifically, by molding the film-shaped or sheet-shaped oxygen absorbing agent composition or oxygen absorbing multilayer body with a method such as vacuum molding, compressed-air molding or plug-assist molding, oxygen absorbing vessels each having a predetermined shape such as a tray, a cup, a bottle, a tube and a PTP (press-through-pack) can be prepared. A multilayer vessel having a predetermined shape can also be formed in one step by coinfecting or successively injecting molten resins through a multilayer multiple die into an injection mold by using an injection machine.

When a heat molded vessel having a flange portion is prepared, a special processing to impart easy release function to the flange portion may be applied to the flange portion. The use of the oxygen absorbing agent composition or the oxygen absorbing multilayer body as the members such as the lid member or the top seal member of a vessel allows the vessel to be imparted with oxygen absorption function.

By molding the oxygen absorbing agent composition or the oxygen absorbing multilayer body of the present embodiment into film shape or sheet shape, the composition or the laminate can also be used as oxygen absorbing agents in the forms such as labels, cards and packings.

When the oxygen absorbing agent composition or the oxygen absorbing multilayer body of the present embodiment is used, irradiation with an energy ray enables the promotion of the start of the oxygen absorption reaction or the increase of the oxygen absorption rate. As the energy ray, for example, visible ray, ultraviolet ray, X-ray, electron beam and γ-ray can be used. The irradiation energy amount can be appropriately selected according to the type of the energy ray used.

The oxygen absorbing agent composition of the present embodiment does not need moisture as an essential component for oxygen absorption, in other words can absorb oxygen irrespective as to whether or not the object to be stored has moisture, and hence can be used in a wide range of applications irrespective of the type of the object to be stored. In particular, the oxygen absorbing agent composition of the present embodiment is free from the generation of odor after oxygen absorption, and hence can be particularly suitably used, for example, for food, prepared food, beverages, health food and pharmaceuticals. In other words, the oxygen absorbing agent composition of the present embodiment and various molded articles such as laminates using the composition are excellent in oxygen absorption performance over a wide range of humidity conditions from a low humidity to a high humidity (relative humidity: 0 to 100%) and are excellent in the flavor retention property, and hence are suitable for packaging various articles.

Specific examples of the object to be stored may include, without being particularly limited to: beverages such as milk, juice, coffee, teas and alcoholic drinks; liquid seasonings such as sauce, soy sauce, noodle dipping sauce and dressings; prepared foods such as soup, stew and curry; paste-like foods such as jam and mayonnaise; fishery products such as tuna, fish and shellfish; dairy processed products and egg processed products such as cheese, butter and eggs; processed meat products such as meat, salami, sausage and ham; vegetables such as carrot, potato, asparagus and shiitake mushroom; fruits; eggs; noodles; rice such as rice or polished rice; grains such as such as beans; rice processed foods or grain processed foods such as cooked rice, glutinous rice boiled with red beans, rice cakes and rice gruel; confectioneries such as bars of sweet jellied adzuki-bean paste, puddings, cakes and buns with bean jam filling; dried foods (foods low in water activity) such as powdered seasoning, ground coffee, coffee beans, tea, powder milk for babies, prepared foods for babies, diet powder foods, prepared care foods, dried vegetables, fried rice cakes and rice crackers; chemicals such as adhesives, pressure-sensitive adhesives, agricultural chemicals and insecticides; pharmaceuticals; health food such as vitamin preparations; pet food; miscellaneous goods such as cosmetics, shampoos, rinses and detergents; and other various articles. In particular, the oxygen absorbing agent composition of the present embodiment is suitable for the packaging materials for the objects tending to be deteriorated in the presence of oxygen such as: beverages such as beer, wine, sake (Japanese rice wine), shochu (Japanese distilled spirit), fruit juice beverages, fruit juices, vegetable juices, carbonated soft drinks and teas; foods such as fruits, nuts, vegetables, meat products, infant food, coffee, jam, mayonnaise, ketchup, edible oil, dressing, sauces, preservable foods boiled down in soy sauce and dairy products; and other objects to be stored such as pharmaceuticals and cosmetics. The water activity is a measure indicating the content of free water in an article, and is represented by a numerical value of 0 to 1; the water activity of an article free from moisture is 0 and the water activity of pure water is 1. Specifically, the water activity Aw of an article is defined by the following formula when the article is sealed in a space, the water vapor pressure in the space after the equilibrium state is reached is represented by P, the vapor pressure of pure water is represented by P0, and the relative humidity in the space is represented by RH (%):

$$Aw = P/P0 = RH/100$$

Before or after the packing (packaging) of the object to be stored, the disinfection treatment of the vessel or the object to be stored can be performed in a manner suitable for the object to be stored. Examples of the disinfection method include: heat disinfections such as a hot water treatment at 100° C. or lower, a pressurized hot water treatment at 100° C. or higher, and an ultra-high-temperature heat treatment at 130° C. or higher; electromagnetic wave disinfections with electromagnetic waves such as, ultraviolet ray, microwave and γ-ray; treatments with gases such as ethylene oxide; and disinfections with chemicals such as hydrogen peroxide and hypochlorous acid.

EXAMPLES

The present invention is described in more detail, with reference to Examples and Comparative Examples presented below, but the present invention is not limited at all by the following Examples. It is to be noted that unless otherwise specified, NMR measurements were performed at room temperature.

The measurement of the oxygen absorption amount and the evaluation of the odor after the oxygen absorption were performed as follows.

(1) Measurement of Oxygen Absorption Amount

Two gas barrier bags formed of an aluminum foil laminate film were prepared. Then, 1 g of the obtained granular oxygen absorbing agent was packed, together with 1000 cc of air, in each of the two gas barrier bags; the relative humidity in one of the two bags was regulated at 100%, the relative humidity of the other of the two bags was regulated at 30%, and the two bags were each sealed. The sealed bags thus obtained were stored in an atmosphere regulated at a temperature of 23° C. for 7 days, the oxygen concentration in each of the sealed bags after the storage was measured with an oxygen concentration meter (trade name: LC-705F, manufactured by Toray Engineering Co., Ltd.), and the oxygen absorption amount in each of the sealed bays was calculated from the measured oxygen concentration.

(2) Evaluation of Odor after Oxygen Absorption

In the same manner as in the measurement of the oxygen absorption amount, a sealed bag stored at a temperature of 23° C. and a relative humidity of 100% or 30% was opened, and the odor in the sealed bag was verified.

The occurrence or nonoccurrence of the change of the odor before and after the oxygen absorption were evaluated, and the case where no change of the odor was found after the oxygen absorption was determined to be the case of "no generation of the odor."

Example 1

A liquid mixture was prepared by mixing cobalt 2-ethylhexanoate so as to have an amount of 0.1 part by mass in terms of the amount of cobalt with 100 parts by mass of indane; the resulting liquid mixture was impregnated into 50 parts by mass of a synthetic calcium silicate (trade name "Microcell E," manufactured by Celite Corp.) to produce a granular oxygen absorbing agent composition.

The measurement of the oxygen absorption amount and the evaluation of the odor were performed, and the results thus obtained are shown in Table 1.

Example 2

An oxygen absorbing agent composition was produced in the same manner as in Example 1 except that cobalt 2-ethylhexanoate was replaced with cobalt naphthenate, and the measurement of the oxygen absorption amount and the evaluation of the odor were performed. The results thus obtained are shown in Table 1.

Example 3

An oxygen absorbing agent composition was produced in the same manner as in Example 1 except that cobalt 2-ethylhexanoate was replaced with iron 2-ethylhexanoate, and the measurement of the oxygen absorption amount and the evaluation of the odors were performed. The results thus obtained are shown in Table 1.

Example 4

An oxygen absorbing agent composition was prepared in the same manner as in Example 1 except that 50 parts by mass of the synthetic calcium silicate was replaced with 120 parts by mass of diatom earth (trade name "RC417," manufactured by Showa Chemical Industry Co., Ltd.), and the measurement of the oxygen absorption amount and the evaluation of the odor were performed. The results thus obtained are shown in Table 1.

Example 5

An oxygen absorbing agent composition was produced in the same manner as in Example 4 except that cobalt 2-ethylhexanoate was replaced with cobalt naphthenate, and the measurement of the oxygen absorption amount and the evaluation of the odor were performed. The results thus obtained are shown in Table 1.

Example 6

In a reaction vessel equipped with a stirrer, a partial condenser, a total condenser, a thermometer, a heating device and a nitrogen introduction tube, 5.2 g (30 mmol) of dimethyl adipate and 12.1 g (90 mmol) of 2-indanol were charged and heated to 130° C. in a nitrogen atmosphere; then, 15 mg of tetrabutyl titanate was added to the reaction mixture and heated to 200° C.; the reaction mixture was allowed to react until methanol was no longer distilled off. Then, the reaction mixture was subjected to distillation at 150° C. and 2 torr to remove the raw materials. To the obtained crude product, 10 g of ethyl acetate was added, and the crude product was purified by recrystallization, to yield a compound A having an indane skeleton in a yield of 90%.

The structural formula of the obtained compound A is shown in Table 1. The results of the NMR analysis are as follows: $^1$H-NMR (400 MHz CDCl$_3$) δ 7.12-7.30 (8H m), 5.51 (2H tt), 3.31 (4H dd), 2.98 (4H dd), 2.26 (4H t), 1.57-1.70 (4H m).

A liquid mixture was prepared by mixing cobalt 2-ethylhexanoate so as to have an amount of 0.1 part by mass in terms of the amount of cobalt with 100 parts by mass of the compound A; the resulting liquid mixture was added to 750 parts by mass of a silica sol (trade name "MEK-ST 40D," manufactured by Nissan Chemical Industries, Ltd., containing 60% by mass of methyl ethyl ketone), the resulting mixture was stirred in a nitrogen atmosphere, at 60° C. for 1 hour; then methyl ethyl ketone was distilled off under a reduced pressure to convert the mixture into a powder, and thus a granular oxygen absorbing agent composition was obtained. The measurement of the oxygen absorption amount and the evaluation of the odor of the oxygen absorbing agent composition were performed in the same manner as in Example 1. The results thus obtained are shown in Table 1.

Example 7

A compound B having an indane skeleton was obtained in the same manner as in Example 6 except that dimethyl adipate was replaced with dimethyl sebacate.

The structural formula of the obtained compound B is shown in Table 1. The results of the NMR analysis are as follows: $^1$H-NMR (400 MHz CDCl$_3$) δ 7.11-7.29 (8H m), 5.52 (2H tt), 3.31 (4H dd), 2.98 (4H dd), 2.23 (4H t), 1.50-1.65 (4H m), 1.08-1.22 (8H m).

Next, an oxygen absorbing agent composition was produced in the same manner as in Example 6, and the measurement of the oxygen absorption amount and the evaluation of the odor were performed. The results thus obtained are shown in Table 1.

Example 8

A compound C having the indane skeleton was obtained in the same manner as in Example 6 except that dimethyl adipate was replaced with dimethyl isophthalate.

The structural formula of the obtained compound C is shown in Table 1. The results of the NMR analysis are as follows: $^1$H-NMR (400 MHz CDCl$_3$) δ 8.60 (1H s), 8.15 (2H d), 7.47 (1H t), 7.17-7.29 (8H m), 5.78 (2H tt), 3.45 (4H dd), 3.19 (4H dd).

Next, an oxygen absorbing agent composition was produced in the same manner as in Example 6, and the measurement of the oxygen absorption amount and the evaluation of the odor were performed. The results thus obtained are shown in Table 1.

TABLE 1

| | | Compound having indane skeleton | | Transition metal catalyst | | Parts by mass based on 100 parts by mass of compound having indane skeleton | Oxygen absorption amount[1] cc/g-agent | | Oxygen absorption amount[2] cc/g-compound | | Generation of odor | |
|---|---|---|---|---|---|---|---|---|---|---|---|---|
| | Type | Structural formula | | Transition metal catalyst | Carrier substance | (in terms of metal amount) | Carrier substance | Humidity 100% | Humidity 30% | Humidity 100% | Humidity 30% | Humidity 100% | Humidity 30% |
| Example 1 | Indane | | | Cobalt ethyl-hexanoate | Synthetic calcium silicate | 0.1 | 50 | 68 | 88 | 101 | 132 | No | No |
| Example 2 | Indane | | | Cobalt naphthenate | Synthetic calcium silicate | 0.1 | 50 | 65 | 87 | 98 | 130 | No | No |
| Example 3 | Indane | | | Iron ethyl-hexanoate | Synthetic calcium silicate | 0.1 | 50 | 40 | 76 | 88 | 168 | No | No |
| Example 4 | Indane | | | Cobalt ethyl-hexanoate | Diatom earth | 0.1 | 120 | 53 | 78 | 117 | 171 | No | No |
| Example 5 | Indane | | | Cobalt naphthenate | Diatom earth | 0.1 | 120 | | | | | No | No |

TABLE 1-continued

| | Compound having indane skeleton | | Transition metal catalyst | | Parts by mass based on 100 parts by mass of compound having indane skeleton | | Oxygen absorption amount[1] cc/g-agent | | Oxygen absorption amount[2] cc/g-compound | | Generation of odor | |
|---|---|---|---|---|---|---|---|---|---|---|---|---|
| Type | Structural formula | | Transition metal catalyst | Carrier substance | Transition metal catalyst (in terms of metal amount) | Carrier substance | Humidity 100% | Humidity 30% | Humidity 100% | Humidity 30% | Humidity 100% | Humidity 30% |
| Example 6 | Compound A | | Cobalt ethylhexanoate | Silica | 0.1 | 300 | 15 | 31 | 60 | 124 | No | No |
| Example 7 | Compound B | | Cobalt ethylhexanoate | Silica | 0.1 | 300 | 18 | 27 | 72 | 108 | No | No |
| Example 8 | Compound C | | Cobalt ethylhexanoate | Silica | 0.1 | 300 | 23 | 14 | 92 | 56 | No | No |

[1] Total amount of oxygen absorbed in 7 days from the start of the test (per 1 g of the oxygen absorbing agent)
[2] Total amount of oxygen absorbed in 7 days from the start of the test (per 1 g of the compound having indane skeleton)

As can be seen from Examples 1 to 8, the oxygen absorbing agent composition of the present invention is free from the generation of the odor after the oxygen absorption, and exhibited excellent oxygen absorption performance both at a high humidity and at a low humidity.

The invention claimed is:

1. An oxygen absorbing agent composition comprising at least one compound having an indane skeleton represented by the following formula (1), a transition metal catalyst, and a carrier substance supporting the at least one compound having an indane skeleton:

[Formula 1]

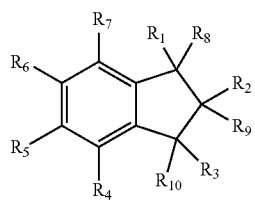

(1)

wherein, in the formula (1), $R_1$ to $R_{10}$ are each independently a hydrogen atom or a monovalent substituent; the monovalent substituent is at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group, an imide group, a substituent represented by the following formula (1a) and a substituent represented by the following formula (1b); these groups may further have a substituent, and two substituents of $R_1$ to $R_{10}$ may be bonded to each other to form a ring;

to the benzylic positions in the indane skeleton, at least one or more hydrogen atoms are bonded;

[Formula 2]

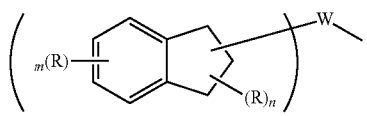

(1a)

[Formula 3]

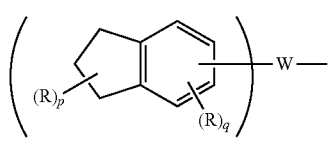

(1b)

wherein, in the formula (1a) and the formula (1b), each R independently represents a monovalent substituent; the monovalent substituent is at least one selected from group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group and an imide group; the groups may further have a substituent, and two substituents may be bonded to each other to form a ring;

W is an atomic bond or a divalent organic group; the divalent organic group is at least one selected from the group consisting of an aromatic hydrocarbon group, a saturated or unsaturated alicyclic hydrocarbon group, a linear or branched, saturated or unsaturated aliphatic hydrocarbon group, a heterocyclic group, —C(=O)—, —OC(=O)—, and —N(H)C(=O)—, and optional combinations of these;

m represents an integer of 0 to 4, n represents an integer of 0 to 5, p represents an integer of 0 to 6, and q represents an integer of 0 to 3; and the carrier substance comprises at least one selected from the group consisting of synthetic calcium silicate, hydrated lime, activated carbon, zeolite, perlite, diatom earth, activated clay, silica, kaolin, talc, bentonite, activated alumina, gypsum, silica alumina, calcium silicate, magnesium oxide, graphite, carbon black, aluminum hydroxide and iron oxide.

2. The oxygen absorbing agent composition according to claim 1, wherein the transition metal catalyst is further supported by the carrier substance.

3. The oxygen absorbing agent composition according to claim 1, wherein the transition metal catalyst comprises at least one transition metal selected from the group consisting of manganese, iron, cobalt, nickel and copper.

4. The oxygen absorbing agent composition according to claim 1, wherein a mixing amount of the transition metal catalyst is 0.001 to 10 parts by mass in terms of the transition metal amount, based on 100 parts by mass of the compound having the indane skeleton.

5. The oxygen absorbing agent composition according to claim 1, wherein the carrier substance is at least one selected from the group consisting of synthetic calcium silicate, diatom earth, silica and activated carbon.

6. The oxygen absorbing agent composition according to claim 1, wherein a mixing amount of the carrier substance is 10 to 1000 parts by mass based on 100 parts by mass of the compound having the indane skeleton.

7. An oxygen absorbing agent package formed by packaging the oxygen absorbing agent composition according to claim 1 with an air permeable packaging material.

* * * * *

UNITED STATES PATENT AND TRADEMARK OFFICE
CERTIFICATE OF CORRECTION

Page 1 of 1

PATENT NO. : 9,771,203 B2
APPLICATION NO. : 14/398582
DATED : September 26, 2017
INVENTOR(S) : S. Okada et al.

It is certified that error appears in the above-identified patent and that said Letters Patent is hereby corrected as shown below:

In the Claims

Column 31, Line 13 (Claim 1, Line 6), "[Formula 1]" should be deleted.
Column 31, Line 43 (Claim 1, Line 24), "[Formula 2]" should be deleted.
Column 31, Line 49 (Claim 1, Line 25), "[Formula 3]" should be deleted.

Signed and Sealed this
Twentieth Day of March, 2018

Andrei Iancu
*Director of the United States Patent and Trademark Office*